A. M. PONKEY.
NUT LOCK.
APPLICATION FILED MAY 31, 1910.
985,059.
Patented Feb. 21, 1911.
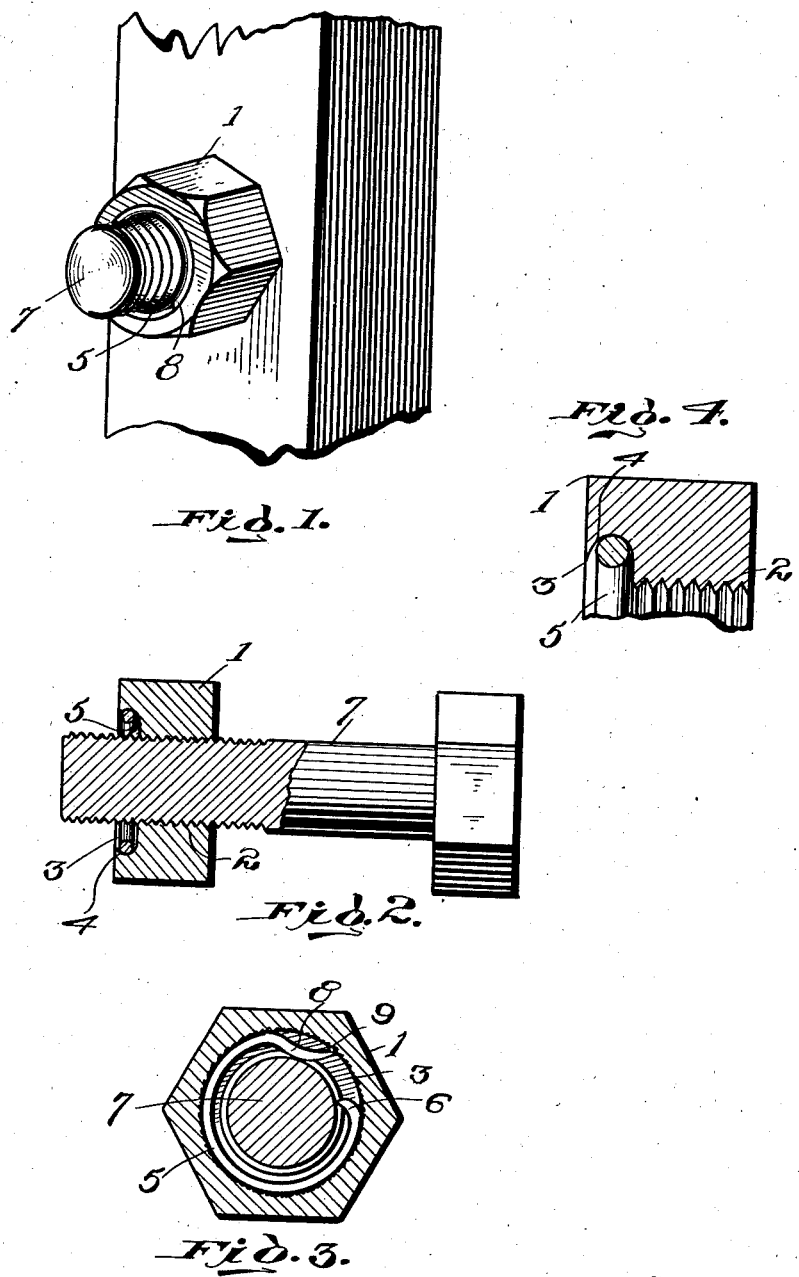
Witnesses
Inventor
Albert M. Ponkey.
By E. E. Trooman,
his Attorney.

UNITED STATES PATENT OFFICE.

ALBERT M. PONKEY, OF DETROIT, MICHIGAN, ASSIGNOR OF ONE-HALF TO CHARLES A. ENDRISS, OF DETROIT, MICHIGAN.

NUT-LOCK.

985,059.

Specification of Letters Patent. Patented Feb. 21, 1911.

Application filed May 31, 1910. Serial No. 564,189.

*To all whom it may concern:*

Be it known that I, ALBERT M. PONKEY, a citizen of the United States of America, residing at Detroit, in the county of Wayne and State of Michigan, have invented certain new and useful Improvements in Nut-Locks, of which the following is a specification, reference being had therein to the accompanying drawing.

This invention relates to nut and bolt locks, and the principal object of the same is to provide a novel nut which is provided with means for the reception of a locking device that will automatically engage the nut and a bolt so that reverse rotation of said nut is prevented.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a perspective view of the improved nut lock. Fig. 2 is a view in longitudinal section showing the nut locked to a bolt. Fig. 3 is a transverse sectional view thereof. Fig. 4 is an enlarged fragmentary longitudinal sectional view.

Referring to said accompanying drawings, it will be seen that the improved nut and bolt lock comprises primarily a nut 1 that is provided with the usual central threaded opening 2, said opening being surrounded by the counterbored opening 3 on the top side of the nut, the surrounding wall of opening 3 being in the form of an annular groove 4 which is preferably roughened or serrated.

The locking device which is carried by the nut 1, is formed of a single length of resilient rod metal bent into a substantially ring-shaped body 5 that is seated in the groove 4. One end of said body is inturned and sharpened to provide a dog 6 that "bites" into the threads of a bolt 7 upon which nut 1 is mounted. The other end portion of said body is inwardly bowed, as indicated at 8 and bears upon the threads of the bolt 7. The outturned pointed end 9 thereof is adapted to "bite" into the serrated or roughened surface of groove 4.

It will be seen from the foregoing that the counterbored and grooved portion of the nut provides a housing for the locking device 5, so that the same cannot become accidentally displaced therefrom, and that the "biting" ends 6 and 9 of said device will be forced into binding engagement with the nut and the bolt if reverse rotation of said nut or bolt is attempted.

What I claim as my invention is:—

1. A nut lock comprising a nut provided with a grooved seat in one end, and a resilient locking device fitted within said seat and provided with sharpened ends, one of said ends engaging the wall of said groove and the other adapted to engage a bolt.

2. A device of the character described comprising a nut provided with a counterbored opening, said opening surrounded by a grooved wall, said wall being roughened, and a ring-shaped resilient locking device seated in said groove and having an outturned pointed end that engages said wall, and an inturned pointed end adapted to engage a bolt.

In testimony whereof I hereunto affix my signature in presence of two witnesses.

ALBERT M. PONKEY.

Witnesses:
MARY E. KLOSTER,
LOUIS F. LINSEL.